(12) United States Patent
Kraft et al.

(10) Patent No.: US 9,753,218 B2
(45) Date of Patent: Sep. 5, 2017

(54) SEMICONDUCTOR DEVICE WITH INTEGRATED MIRROR AND METHOD OF PRODUCING A SEMICONDUCTOR DEVICE WITH INTEGRATED MIRROR

(71) Applicant: ams AG, Unterpremstaetten (AT)

(72) Inventors: Jochen Kraft, Oberaich (AT); Joerg Siegert, Graz (AT); Ewald Stueckler, Unterpremstaetten (AT)

(73) Assignee: AMS AG, Unterpremstaetten (AT)

( * ) Notice: Subject to any disclaimer, the term of this patent is extended or adjusted under 35 U.S.C. 154(b) by 0 days.

(21) Appl. No.: 15/101,406

(22) PCT Filed: Nov. 17, 2014

(86) PCT No.: PCT/EP2014/074786
§ 371 (c)(1),
(2) Date: Jun. 2, 2016

(87) PCT Pub. No.: WO2015/082203
PCT Pub. Date: Jun. 11, 2015

(65) Prior Publication Data
US 2016/0334572 A1 Nov. 17, 2016

(30) Foreign Application Priority Data
Dec. 3, 2013 (EP) ..................... 13195512

(51) Int. Cl.
*G02B 6/12* (2006.01)
*G02B 6/122* (2006.01)
(Continued)

(52) U.S. Cl.
CPC ............. *G02B 6/122* (2013.01); *G02B 6/132* (2013.01); *G02B 6/4214* (2013.01);
(Continued)

(58) Field of Classification Search
CPC ................................. G02B 6/122; G02B 6/132
(Continued)

(56) References Cited

U.S. PATENT DOCUMENTS 5,323,407 A * 6/1994 Valette ..................... H01S 5/141
359/838
5,373,570 A 12/1994 Menigaux et al.
(Continued)

FOREIGN PATENT DOCUMENTS

EP     1818701 A1     8/2007
JP     2001330743 A   11/2001
(Continued)

OTHER PUBLICATIONS

Nguyen, S.V., "High-Density Plasma Chemical Vapor Deposition of Silicon-Based Dielectric Films for Integrated Circuits", IBM Journal of Research & Development, vol. 43, No. 1/2, 1999, pp. 1-19.

*Primary Examiner* — Jerry Blevins
(74) *Attorney, Agent, or Firm* — McDermott Will & Emery LLP

(57) ABSTRACT

The semiconductor device comprises a substrate (1) of semiconductor material, a dielectric layer (2) above the substrate, a waveguide (3) arranged in the dielectric layer, and a mirror region (4) arranged on a surface of a mirror support (5) integrated on the substrate. A mirror is thus formed facing the waveguide. The surface of the mirror support and hence the mirror are inclined with respect to the waveguide.

13 Claims, 5 Drawing Sheets

(51) Int. Cl.
  *G02B 6/42* (2006.01)
  *G02B 6/132* (2006.01)
  *G02B 6/43* (2006.01)
  *G02B 6/136* (2006.01)

(52) U.S. Cl.
  CPC .......... *G02B 6/12004* (2013.01); *G02B 6/136* (2013.01); *G02B 6/43* (2013.01); *G02B 2006/12104* (2013.01)

(58) Field of Classification Search
  USPC .......................................................... 385/14
  See application file for complete search history.

(56) References Cited

U.S. PATENT DOCUMENTS

| | | | | |
|---|---|---|---|---|
| 5,920,664 | A * | 7/1999 | Hirabayashi | G02B 6/43 349/196 |
| 6,046,840 | A * | 4/2000 | Huibers | G02B 26/0833 359/224.1 |
| 2003/0016907 | A1* | 1/2003 | LoCascio | B82Y 10/00 385/27 |
| 2003/0113067 | A1 | 6/2003 | Koh et al. | |
| 2005/0174802 | A1 | 8/2005 | Wu et al. | |
| 2008/0129911 | A1* | 6/2008 | Huang | G02F 1/136209 349/44 |
| 2009/0074353 | A1* | 3/2009 | Yanagisawa | G02B 6/4214 385/14 |
| 2009/0188610 | A1 | 7/2009 | Yamamoto | |
| 2009/0190878 | A1 | 7/2009 | Yanagisawa | |
| 2013/0121354 | A1 | 5/2013 | Takaki et al. | |
| 2014/0363120 | A1* | 12/2014 | Stephens | G02B 6/136 385/14 |

FOREIGN PATENT DOCUMENTS

| | | |
|---|---|---|
| JP | 2002296434 A | 10/2002 |
| JP | 2005345928 A | 12/2005 |

* cited by examiner

SEMICONDUCTOR DEVICE WITH INTEGRATED MIRROR AND METHOD OF PRODUCING A SEMICONDUCTOR DEVICE WITH INTEGRATED MIRROR

BACKGROUND OF THE INVENTION

A semiconductor chip comprising an integrated circuit can be provided with optical components to enable a performance of both optical functions like optical data transfer, switching, multiplexing and modulation and electronical functions like data processing. An integration of the optical components is desired to obtain compact dimensions. An integrated waveguide may be used for a transfer of optical signals. Mirrors are suitable to couple radiation from an external source into the waveguide and to reflect radiation propagating in the waveguide towards external optical devices.

U.S. Pat. No. 5,373,570 A discloses a process for producing a device structure with integrated optical waveguide and mirror. A substrate is etched according to a crystalline plane to form an inclined planar surface. Various layers are epitaxially grown on the substrate to form an optical waveguide. The substrate is removed from the rear side to uncover the inclined plane, thus forming a mirror reflecting light from the optical waveguide in a given direction. A deposition of a metallization on the back of the mirror is proposed to improve its reflective qualities.

US 2013/0121354 A1 discloses an optical interconnection system for a plurality of semiconductor devices including surface emitting laser arrays connected via silicon optical waveguides comprising a plurality of optical couplers and splitters. The waveguides comprise a core portion confined by cladding portions of lower refractive index. In the core portions, a plurality of reflecting portions are formed by groove processing at positions above each of the surface emitting laser devices to reflect the laser light into the core portion.

EP 1 818 701 A1 discloses an opto-electronic interfacing device for mounting on a printed circuit board. Optical waveguides are formed in a substrate, and an optical connector is attached to the substrate and optically aligned to one or more of the waveguides, which may form an optical splitter/combiner. An integrated mirror is formed on an inclined end face of the substrate provided with a mirror finish to reflect optical signals entering or emerging from the waveguides through substantially 90° with respect to the plane of the waveguide layer.

The publication of S. V. Nguyen, "High-density plasma chemical vapor deposition of silicon-based dielectric films for integrated circuits", IBM Journal of Research & Development vol. 43(1/2) (1999), pp. 1 to 19, describes various technical details of high-density plasma chemical vapor deposition, in particular for the formation of interlevel insulation, gap filling, and planarization.

SUMMARY OF THE INVENTION

The semiconductor device comprises a substrate of semiconductor material, a dielectric layer above the substrate, a waveguide arranged in the dielectric layer, and a mirror region arranged on a surface of a mirror support integrated on the substrate. A mirror is thus formed facing the waveguide. The surface of the mirror support and hence the mirror are inclined with respect to the waveguide. The mirror support is a high-density plasma deposited oxide.

In an embodiment of the semiconductor device, the mirror region is a mirror layer arranged conformal with the surface of the mirror support. The mirror layer may especially be gold, silver, copper, aluminum or TiN.

In a further embodiment the mirror region is a filling of an opening of the dielectric layer. The filling comprises a higher index of refraction than the mirror support. The filling may especially be silicon if the mirror support is a silicon oxide, for instance.

In a further embodiment the surface of the mirror support is arranged at an angle between 40° and 50° with respect to the waveguide.

A further embodiment comprises a further surface of the mirror support. The mirror region forms a further mirror on the further surface. The mirror support is arranged between parts of the waveguide facing the mirror and the further mirror, respectively. The mirror and the further mirror may thus reflect incident radiation into two opposite waveguides, for example.

In a further embodiment the surface and the further surface of the mirror support are planar and form an angle between 80° and 100°.

The method of producing the semiconductor device comprises arranging a waveguide in a dielectric layer on a substrate of semiconductor material, forming an opening in the dielectric layer, forming a mirror support by a high-density plasma deposition of oxide in the opening, the mirror support comprising a surface that is inclined with respect to the waveguide, and arranging a mirror region on the surface of the mirror support, thus forming a mirror.

In a variant of the method, the mirror support is formed by a high-density plasma deposition of silicon oxide.

In a further variant of the method, a thinned layer portion of the dielectric layer is left in the opening, and the mirror support is formed on surfaces of the thinned layer portion.

In a further variant of the method, a recess is formed in the substrate adjacent to the thinned layer portion of the dielectric layer, and the mirror support is partially arranged within the recess.

In a further variant of the method, a sacrificial layer is formed after forming the mirror support, so that the sacrificial layer does not cover an area provided for the mirror region. The mirror region is formed as a mirror layer. To this end a reflective layer is applied on the sacrificial layer and on the area provided for the mirror region. The sacrificial layer and portions of the reflective layer that are applied on the sacrificial layer are then removed (lift-off), and the mirror layer is thus formed by a remaining portion of the reflective layer.

In a further variant of the method, the mirror region is formed by an epitaxial growth of silicon after forming the mirror support. The inclined surface of the mirror support is thus covered and the opening is filled.

In a further variant of the method, the mirror region is formed by a deposition of polysilicon on the surface of the mirror support, thus filling the opening.

The following is a detailed description of examples of the semiconductor device and the method of producing the semiconductor device in conjunction with the appended figures.

DETAILED DESCRIPTION

Figure 1:
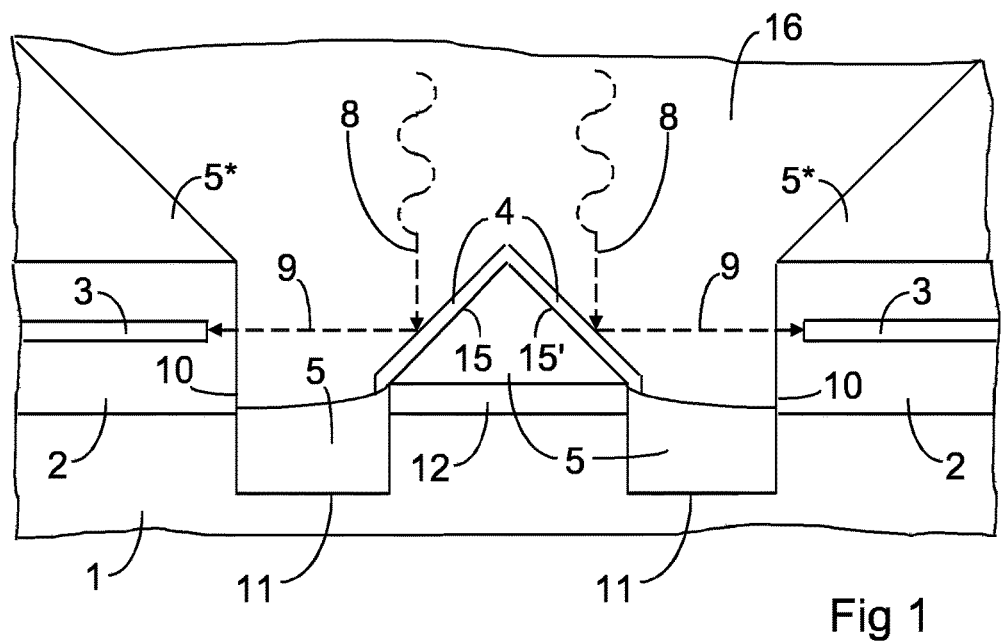
FIG. 1 is a cross section of an embodiment of the semiconductor device.

FIG. 1 is a cross section of an embodiment of the semiconductor device including a mirror layer. A substrate 1 of semiconductor material, which may be silicon, for instance, is provided with a dielectric layer 2, which can be an oxide or nitride of the semiconductor material, for instance, and is arranged on or above a main surface of the substrate 1. A waveguide 3 is embedded in the dielectric layer 2 and extends in a plane that may be parallel to the substrate surface, for instance. A mirror region is formed by a mirror layer 4 of a reflective material, which is arranged on a surface 15 of a mirror support 5 in a gap of the dielectric layer 2. The mirror layer 4 forms a reflecting mirror or, if the mirror layer 4 is sufficiently thin, a semi-transparent mirror, which can be used as a beam splitter, for instance. The surface 15 is inclined with respect to the plane in which the waveguide 3 is arranged. The angle of inclination is typically between 40° and 50° and may especially be 45°.

The mirror support 5 may be arranged in an opening 10 of the dielectric layer 2. The opening 10 may be left void or filled with a cover layer 16, which may be a dielectric material like an oxide or nitride of the semiconductor material, for instance, and in particular may be the same material as the dielectric layer 2. If a cover layer 16 is present, the material of the cover layer 16 is selected to be sufficiently transparent to the radiation that is to be transmitted. The waveguide 3 may reach to the opening 10, or the end of the waveguide 3 may instead be arranged at a small distance from the opening 10 as shown in FIG. 1.

In the embodiment according to FIG. 1, the mirror layer 4 is also present on the side facing away from the inclined surface 15, where it is arranged on a further surface 15' of the mirror support 5. The further surface 15' is also inclined with respect to the plane in which the waveguide 3 is arranged. The angle of inclination is typically between 40° and 50° and may especially be 45°. The inclined surface 15 and the further inclined surface 15' of the mirror support 5 may be essentially planar and typically form an angle between 80° and 100°, in particular an angle of 90°. The mirror support 5 may be arranged between parts of the waveguide 3 facing the inclined surface 15 and the further inclined surface 15', respectively. The mirror layer 4 thus forms mirrors facing the waveguide 3 on two opposite sides of the mirror support 5 and is thus suitable to reflect incident radiation 8 into two opposite sections of the waveguide 3 or to reflect radiation exiting the waveguide 3 from two opposite sides into a direction pointing away from the substrate 1. The mirror support 5 may be provided with further inclined surfaces facing various further directions. The incident radiation 8 and the reflected radiation 9 are indicated in FIG. 1 by broken lines. The indicated directions of the radiation 8, 9 are reversed if radiation exiting the waveguide 3 is reflected into a direction pointing away from the substrate 1.

In the embodiment according to FIG. 1, a thinned layer portion 12 of the dielectric layer 2 is present in the center of the opening 10, and the mirror support 5 is arranged on surfaces of the thinned layer portion 12. Furthermore, a recess 11 is present in the substrate 1, the recess 11 being located symmetrically with respect to the thinned layer portion 12, and portions of the mirror support 5 are arranged in the recess 11. The shape of the opening 10 and the recess 11 is especially suitable for the accommodation of the mirror support 5 and for the method of producing the semiconductor device. A top portion 5* of the material of the mirror support 5 may be present on the upper surface of the dielectric layer 2 as a result of the production process.

Figure 2:
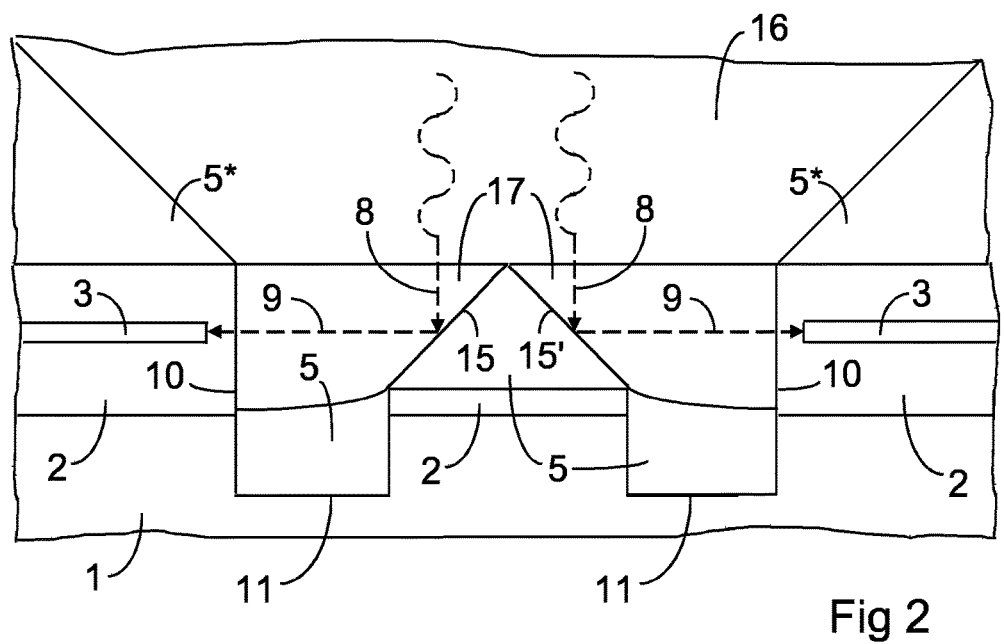
FIG. 2 is a cross section of a further embodiment of the semiconductor device.

FIG. 2 is a cross section of a further embodiment of the semiconductor device including a mirror region for total internal reflection. Elements of the embodiment according to FIG. 1 that correspond to similar elements of the embodiment according to FIG. 1 are designated with the same reference numerals. The embodiment according to FIG. 2 comprises a mirror region formed by a filling 17 in the opening 10 of the dielectric layer 2 and in the recess 11 of the substrate 1, the filling 17 covering the inclined surface 15 and the further inclined surface 15' of the mirror support 5. The material of the filling 17 has a higher index of refraction than the material of the mirror support 5. If the mirror support 5 is a silicon oxide, for instance, the filling 17 may be crystalline or polycrystalline silicon, for instance.

The ratio of the indices of refraction may be adapted to yield a critical angle for total internal reflection that is smaller than 40°, so that the incident radiation 8 impinging on the inclined surface 15 or on the further inclined surface 15' is subject to total internal reflection if the angle between the normal to the inclined surface and the direction of the incident radiation 8 is larger than 40°. Especially a rectangular reflection is enabled in this way.

The incident radiation 8 and the reflected radiation 9 are indicated in FIG. 2 by broken lines. The indicated directions of the radiation can be reversed, if radiation exiting the waveguide 3 is to be reflected into the upward direction pointing away from the substrate 1.

Figure 3:
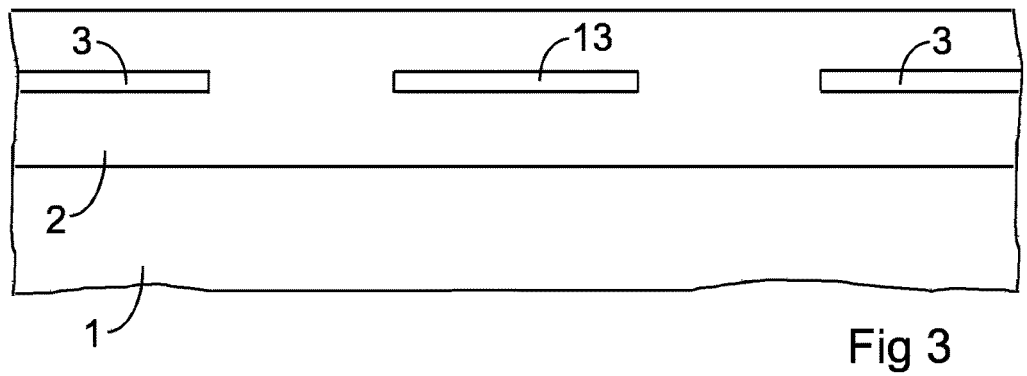
FIG. 3 is a cross section of an intermediate product of a method of producing the semiconductor device.

A method of producing the semiconductor device is described in the following in conjunction with FIGS. 3 to 11, which are cross sections of intermediate products. FIG. 3 is a cross section of a substrate 1 of semiconductor material, which may be silicon, for instance, carrying a dielectric layer 2, which may be silicon oxide, especially silicon dioxide, for instance, on a main substrate surface. The dielectric layer 2 may be produced by applying a sequence of partial layers, which may also serve as intermetal dielectric of a wiring, for instance. A waveguide 3 embedded in the dielectric layer 2 can be produced by applying a structured layer, which may be silicon, for instance, on one or more partial layers of the dielectric layer 2 in order to form the waveguide 3, and subsequently covering the waveguide 3 by one or more further partial layers of the dielectric layer 2. In this way the waveguide 3 is arranged in a plane that is parallel to the main substrate surface. The waveguide 3 optionally comprises a portion provided as a sacrificial waveguide 13, which will later be removed.

Figure 4:
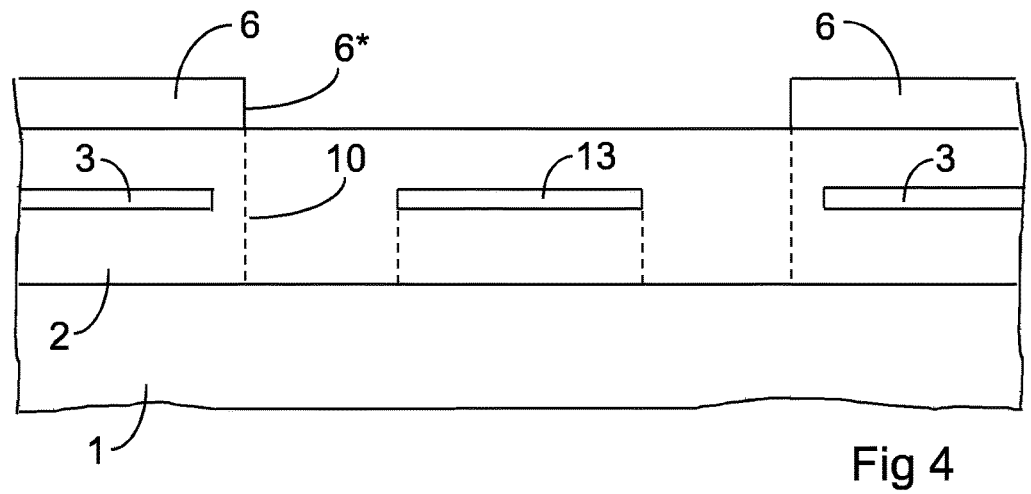
FIG. 4 is a cross section according to FIG. 3 after an application of a mask.

FIG. 4 is a cross section according to FIG. 3 after an application of a mask 6 comprising a window 6* above the sacrificial waveguide 13. The mask 6 is used to form an opening 10 in the dielectric layer 2 in the region that is indicated in FIG. 4 by vertical broken lines.

Figure 5:
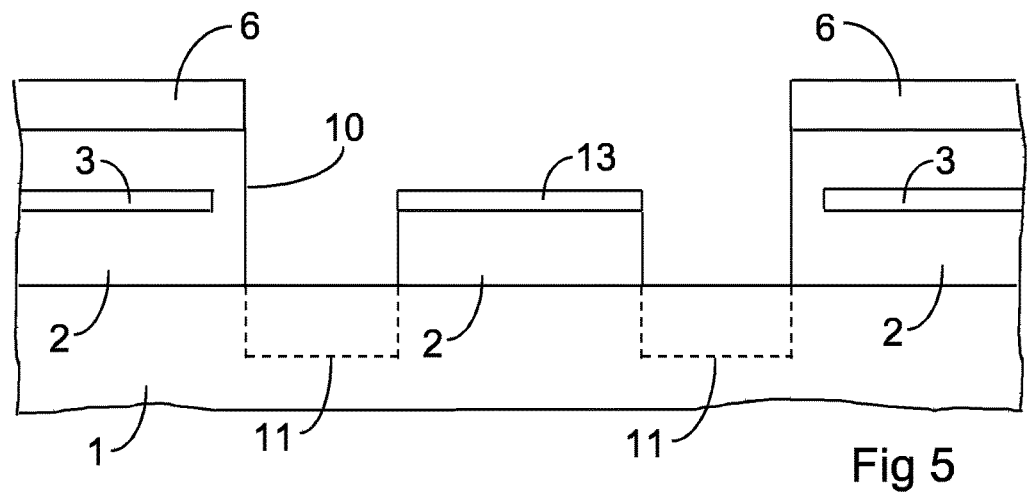
FIG. 5 is a cross section according to FIG. 4 after the formation of an opening in an upper layer.

FIG. 5 is a cross section according to FIG. 4 after the formation of the opening 10, which can be produced by etching the dielectric layer 2, for instance. If the substrate 1 and the waveguide 3 are silicon and the dielectric layer 2 is an oxide, anisotropically etching the oxide selectively with respect to the silicon does not attack the region of the dielectric layer 2, which is covered and thus protected by the sacrificial waveguide 13, and yields the structure shown in FIG. 5. A recess 11 may then optionally be produced in the substrate 1 in the region that is indicated in FIG. 5 by broken contours.

Figure 6:
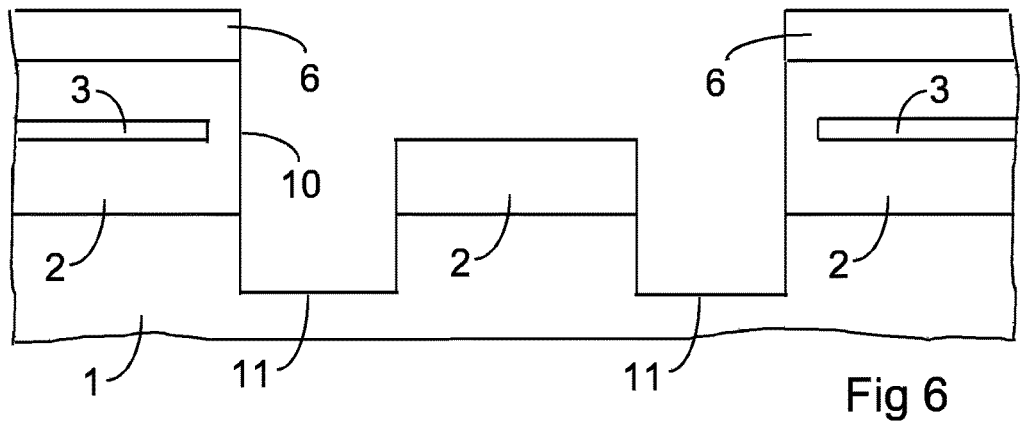
FIG. 6 is a cross section according to FIG. 5 after the formation of a recess in the substrate.

FIG. 6 is a cross section according to FIG. 5 after the formation of the recess 11 in the substrate 1. The recess 11 can be produced by etching into the substrate 1, for instance. If the waveguide 3 is formed from the same semiconductor material as the substrate 1, which may be silicon, for instance, the sacrificial waveguide 13 is removed during the etching step. If the semiconductor material is etched selectively with respect to the dielectric layer 2, the portion of the dielectric layer 2 located under the sacrificial waveguide 13 serves as an etch mask after the removal of the sacrificial waveguide 13.

Figure 7:
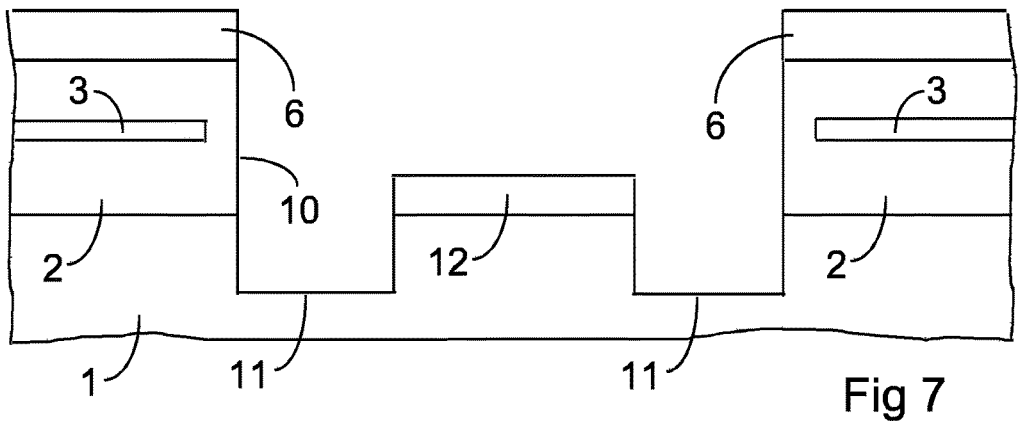
FIG. 7 is a cross section according to FIG. 6 after a further partial removal of the upper layer.

FIG. 7 is a cross section according to FIG. 6 after again etching the dielectric layer 2 selectively with respect to the semiconductor material. In this method step the portion of the dielectric layer 2 that remained within the circumference of the opening 10 is thinned until only a thinned layer portion 12 of the dielectric layer 2 is present in the center of the opening 10. The thinned layer portion 12 facilitates the arrangement of the mirror support 5.

Figure 8:
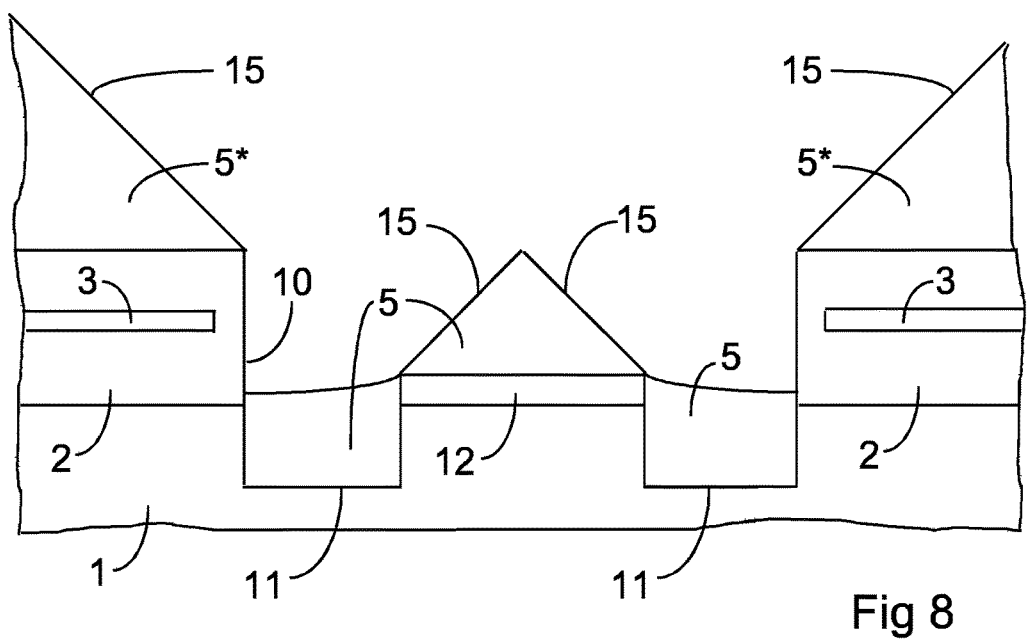
FIG. 8 is a cross section according to FIG. 7 after an application of a layer with inclined slopes.

FIG. 8 is a cross section according to FIG. 7 after the removal of the mask 6 and the formation of the mirror support 5. A high-density plasma chemical vapor deposition (HDP CVD) of an oxide, optionally a silicon oxide like silicon dioxide, for instance, is suitable to produce a layer for the mirror support 5. In such a HDP CVD deposition process, the surface of the deposited oxide, especially silicon oxide, is simultaneously bombarded with argon ions. The inclination of the surface facets formed next to trenches depends on the relation of the deposition rate and the etching rate and can be adapted to individual requirements by adjusting the precursor gas flow, the pressure and other parameters of the plasma. Owing to the permanent flux of argon ions towards the surface, a certain amount of argon is incorporated in the oxide layer. Thus the application of HDP CVD for the generation of the oxide is indicated by the argon contents of the oxide layer.

The high-density plasma deposition can be adapted to allow the deposited layer to be formed in a precise manner yielding inclined surfaces 15 of predetermined slopes. The inclined surfaces of the remaining portions of the deposited layer and the plane of the waveguide 3 may especially form an angle of approximately 45°. The produced mirror support 5 is self-aligned with respect to the waveguide 3 by the thinned layer portion 12 of the dielectric layer 2, whose position is predefined by the sacrificial waveguide 13. Top portions 5* of the deposited layer may remain on the upper surface of the dielectric layer 2. The mirror is formed on the inclined surfaces 15 within the opening 10 by applying a suitable mirror region.

Figure 9:
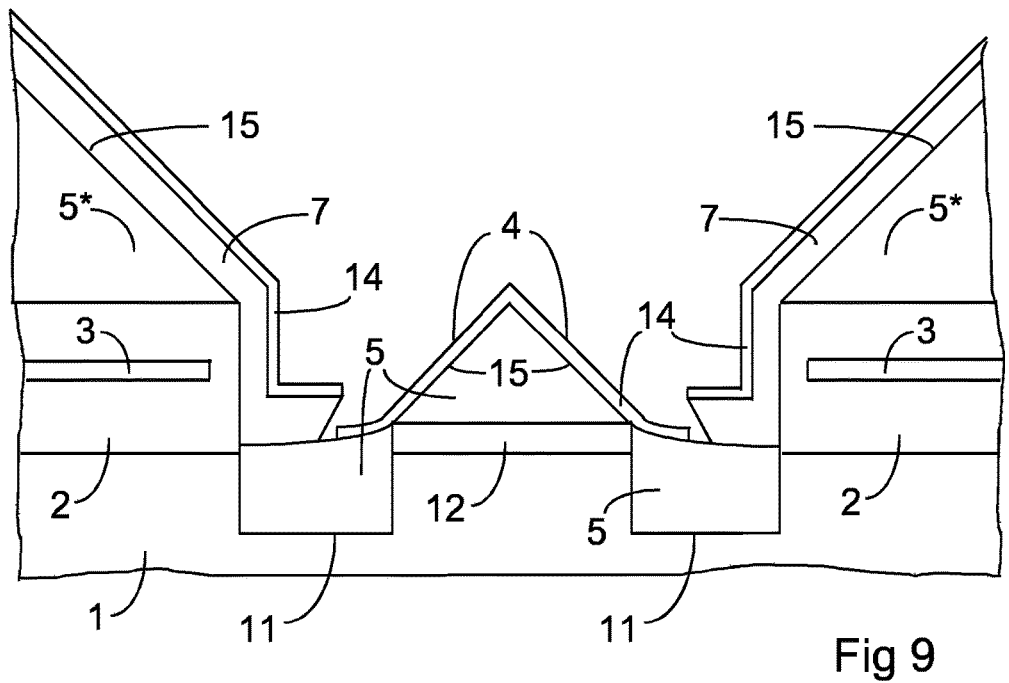
FIG. 9 is a cross section according to FIG. 8 after an application of layers for a lift-up step.

FIG. 9 is a cross section according to FIG. 8 after the application of further layers. A sacrificial layer 7 is applied on the entire surface except for an area that is provided for the mirror. A reflective layer 14, which may be gold, silver, copper, aluminum or TiN, for instance, is applied on the sacrificial layer 7 and on the mirror support 5. The reflective layer 14 includes a section that is provided for a mirror layer 4. The sacrificial layer 7 is used as a lift-off mask and is removed together with the portion of the reflective layer 14 residing on the sacrificial layer 7.

Figure 10:
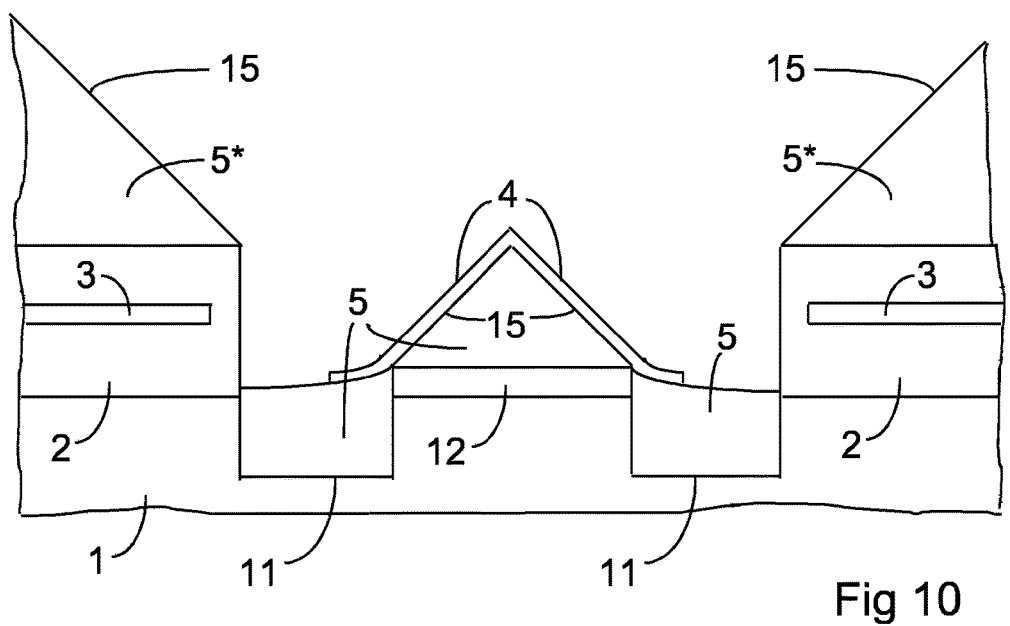
FIG. 10 is a cross section according to FIG. 9 after lift-up forming a mirror layer.

FIG. 10 is a cross section according to FIG. 9 after lift-off. A reflective mirror layer 4 remaining from the reflective layer 14 forms planar mirrors at an angle of 45° with respect to the plane of the waveguide 3, according to the embodiment shown in FIG. 1. If the mirror is intended to function as a beam splitter, the reflective layer 14 is applied sufficiently thin to be semi-transparent to the intended radiation, so that only a portion of the radiation exiting the waveguide 3 on one side of the mirror support 5 is reflected, whereas the remaining portion of the radiation is allowed to penetrate the mirror and the mirror support 5 and enter the waveguide 3 on the opposite side. A cover layer 16 that is radiation-transmissive may be applied to fill the opening 10 as shown in FIG. 1. Instead, the opening 10 can be left void, and if further oxide is deposited in later stages of the production process, the oxide is removed from the opening 10 to restore the void.

Figure 11:
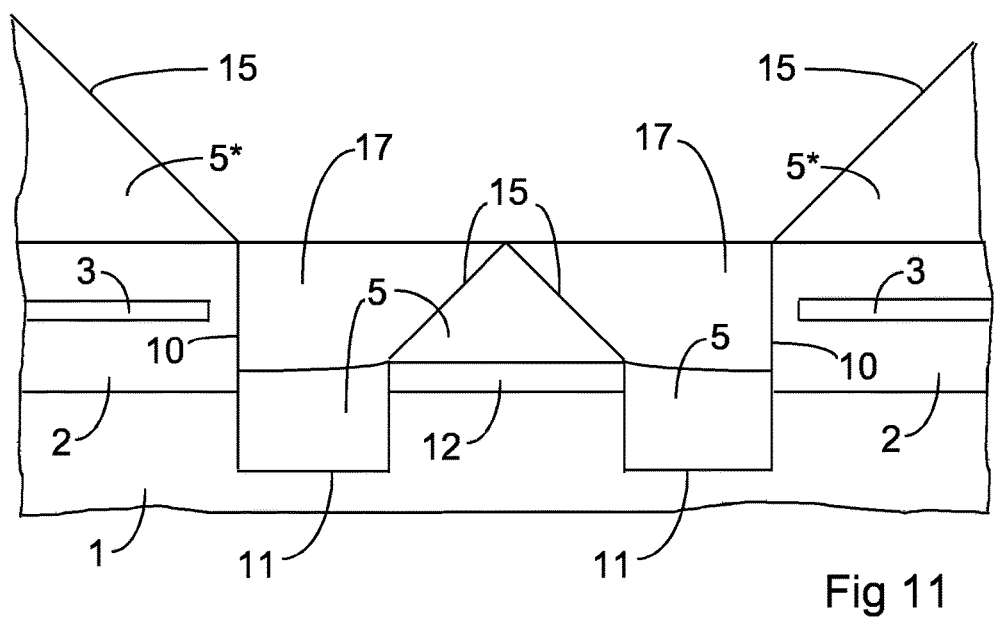
FIG. 11 is a cross section according to FIG. 8 after an application of a filling layer enabling total internal reflection.

FIG. 11 is a cross section according to FIG. 8 for a variant of the method for producing the embodiment according to FIG. 2. In this variant the mirror region is formed in a different way by arranging a filling 17 in the opening 10 of the dielectric layer 2. The filling 17 is applied on the inclined surfaces 15 of the mirror support 5 and is formed from a material having a refractive index that is higher than the refractive index of the mirror support 5 in order to allow the radiation to be reflected by total internal reflection at the boundary between the filling 17 and the mirror support 5. The filling 17 can be a semiconductor material, especially crystalline or polycrystalline silicon, which may be particularly suitable if the mirror support 5 is an oxide of the semiconductor material. The filling 17 can be formed by an epitaxial growth, for instance. A cover layer 16 that is radiation-transmissive may be applied above the filling 17 as shown in FIG. 2. Instead, the region above the filling 17 can be left void, and if further oxide is deposited in later stages of the production process, the oxide is removed from the surface of the filling 17 to restore the void.

The semiconductor device may additionally comprise electronic components, in particular CMOS circuits. The integrated mirror provides a compact arrangement of electronic components and optical components in and on the same substrate, thus allowing cheaper production, a closer arrangement of the mirror in the vicinity of the waveguide and a greater precision of the optical performance of the device. An assembly of separate parts is avoided. In particular, no separate mirror devices have to be mounted to opto-electronical devices, which are thus substantially improved.

The invention claimed is:
1. A semiconductor device, comprising:
a substrate of semiconductor material;
a dielectric layer above the substrate;
a waveguide arranged in the dielectric layer;
a mirror support arranged level with the waveguide, the mirror support comprising a surface that is inclined with respect to the waveguide;
the mirror support being a high-density plasma deposited oxide; and a mirror region being arranged on the surface of the mirror support, the mirror region forming a mirror facing the waveguide and being inclined with respect to the waveguide, wherein the waveguide extends in a plane, and the surface of the mirror support is inclined with respect to the plane by an angle of inclination between 40° and 50°, wherein the mirror region is a filling of an opening of the dielectric layer, and is located between the dielectric layer and the mirror support, wherein the filling comprises a higher index of refraction than the mirror support, wherein the mirror support is a silicon oxide, and wherein the filling is silicon.

2. The semiconductor device of claim 1, wherein the mirror region is a mirror layer arranged conformal with the surface of the mirror support.

3. The semiconductor device of claim 2, wherein the mirror layer is gold, silver, copper, aluminum or TiN.

4. The semiconductor device of claim 1, further comprising:

a further surface of the mirror support, the mirror region forming a further mirror on the further surface, the mirror support being arranged between parts of the waveguide facing the mirror and the further mirror, respectively.

5. The semiconductor device of claim 4, wherein the surface and the further surface of the mirror support are planar and form an angle between 80° and 100°.

6. A method of producing a semiconductor device, comprising:

arranging a waveguide in a dielectric layer on a substrate of semiconductor material;

forming an opening in the dielectric layer;

forming a mirror support in the opening, the mirror support comprising a surface that is inclined with respect to the waveguide; and arranging a mirror region on the surface of the mirror support, thus forming a mirror, wherein the waveguide extends in a plane, and the surface of the mirror support is inclined with respect to the plane by an angle of inclination between 40° and 50°, wherein the mirror support is formed by a high-density plasma deposition of silicon oxide, and wherein after forming the mirror support, the mirror region is formed by an epitaxial growth of silicon, thus covering the inclined surface of the mirror support and filling the opening.

7. The method according to claim 6, wherein a thinned layer portion of the dielectric layer is left in the opening, and the mirror support is formed on surfaces of the thinned layer portion.

8. The method according to claim 7, wherein a recess is formed in the substrate adjacent to the thinned layer portion of the dielectric layer, and the mirror support is partially arranged within the recess.

9. The method according to claim 6, further comprising:

forming a sacrificial layer after forming the mirror support, the sacrificial layer not covering an area provided for the mirror region;

forming the mirror region as a mirror layer;

applying a reflective layer on the sacrificial layer and on the area provided for the mirror region; and removing the sacrificial layer, the mirror layer thus being formed by a remaining portion of the reflective layer.

10. A method of producing a semiconductor device, comprising:

arranging a waveguide in a dielectric layer on a substrate of semiconductor material;

forming an opening in the dielectric layer;

forming a mirror support in the opening, the mirror support comprising a surface that is inclined with respect to the waveguide; and arranging a mirror region on the surface of the mirror support, thus forming a mirror, wherein the waveguide extends in a plane, and the surface of the mirror support is inclined with respect to the plane by an angle of inclination between 40° and 50°, wherein the mirror support is formed by a high-density plasma deposition of silicon oxide, and wherein after forming the mirror support, the mirror region is formed by a deposition of polysilicon on the surface of the mirror support, thus filling the opening.

11. The method according to claim 10, wherein a thinned layer portion of the dielectric layer is left in the opening, and the mirror support is formed on surfaces of the thinned layer portion.

12. The method according to claim 11, wherein a recess is formed in the substrate adjacent to the thinned layer portion of the dielectric layer, and the mirror support is partially arranged within the recess.

13. The method according to claim 10, further comprising:

forming a sacrificial layer after forming the mirror support, the sacrificial layer not covering an area provided for the mirror region;

forming the mirror region as a mirror layer;

applying a reflective layer on the sacrificial layer and on the area provided for the mirror region; and removing the sacrificial layer, the mirror layer thus being formed by a remaining portion of the reflective layer.

* * * * *